United States Patent [19]

Krueger et al.

[11] 3,919,297
[45] Nov. 11, 1975

[54] N-(1,1-DI-PHOSPHONO ETHYL) ACETAMIDINE, PROCESS OF MAKING IT, AND METHOD OF USING IT FOR PREVENTING SCALE FORMATION

[75] Inventors: Friedrich Krueger, Edingen; Walter Michel, Ilvesheim, both of Germany

[73] Assignee: Joh. A. Benckiser GmbH, Ludwigshafen (Rhine), Germany

[22] Filed: Mar. 29, 1974

[21] Appl. No.: 456,366

[30] Foreign Application Priority Data
Apr. 2, 1973 Germany................................ 2316396

[52] U.S. Cl. ............ 260/502.5; 210/58; 252/180; 252/526; 252/545; 252/DIG. 10; 252/DIG. 11; 252/DIG. 17; 260/429 J; 260/438.5; 260/439 R
[51] Int. Cl.² ................................................ C07F 9/38
[58] Field of Search ................................ 260/502.5

[56] References Cited
UNITED STATES PATENTS
3,769,406 10/1973 Anatol et al. .................... 260/502.5
3,846,420 11/1974 Wollmann et al. .............. 260/502.5

FOREIGN PATENTS OR APPLICATIONS
1,002,355 2/1957 Germany ........................ 260/502.5

*Primary Examiner*—Joseph E. Evans
*Attorney, Agent, or Firm*—Erich M. H. Radde

[57] ABSTRACT

N-(1,1-Di-phosphono ethyl) acetamidine has proved to be an excellent agent for preventing scale and deposit formation in aqueous systems, even when added in substoichiometric amounts. It is produced by reacting urea or acetylurea with acetylchloride and phosphorous acid or a mixture of phosphorus trichloride and water in an amount sufficient to produce phosphorous acid. The acetylchloride may be formed during the reaction from phosphorous trichloride and glacial acetic acid or acetic acid anhydride.

1 Claim, 3 Drawing Figures

INFRARED SPECTRUM OF N-(1,1-DI-PHOSPHONO ETHYL) ACETAMIDINE

P³¹-NUCLEAR MAGNETIC RESONANCE SPECTRUM OF N-(1,1-DI-PHOSPHONO ETHYL) ACETAMIDINE

δ = -15,0 ppm

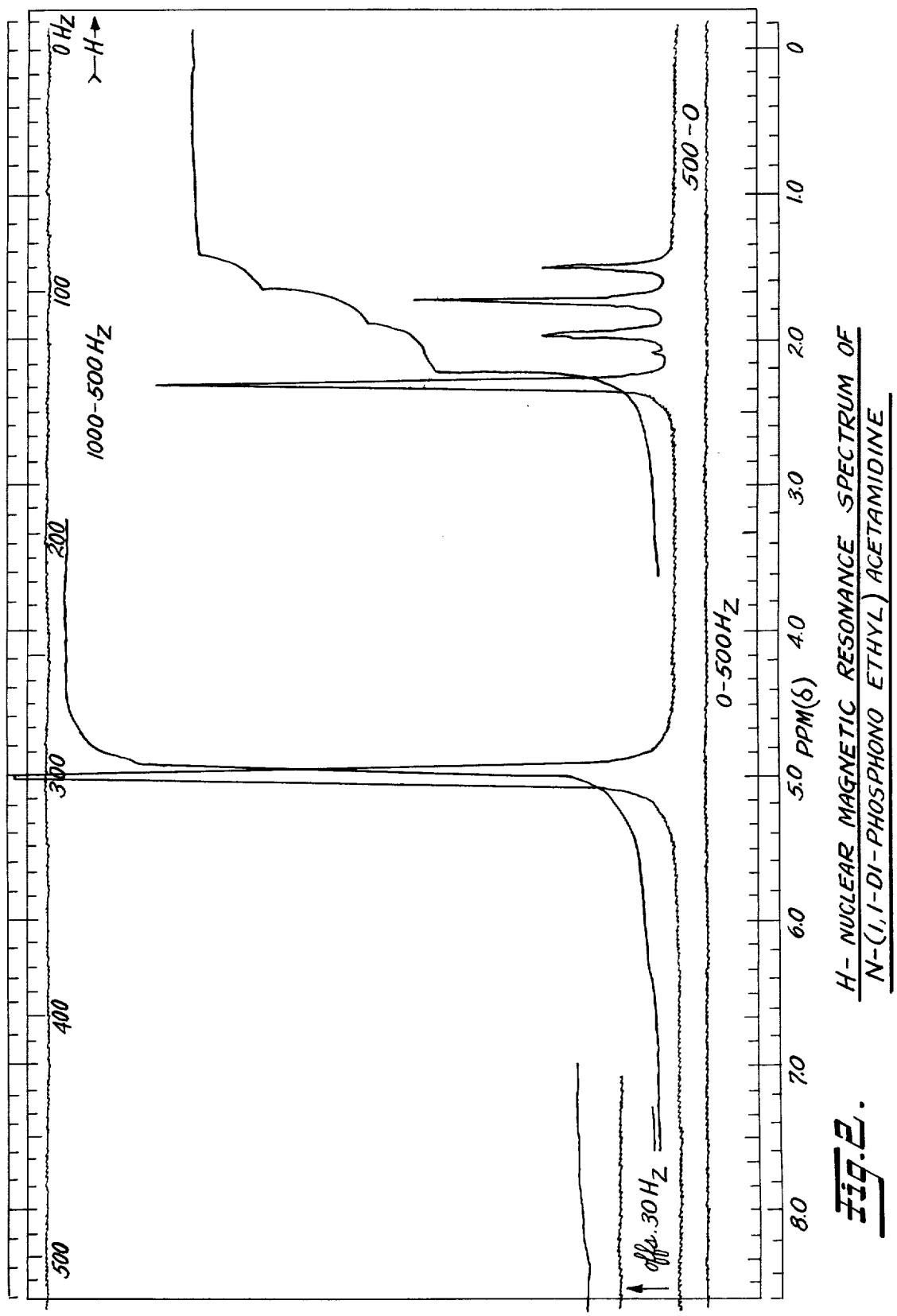

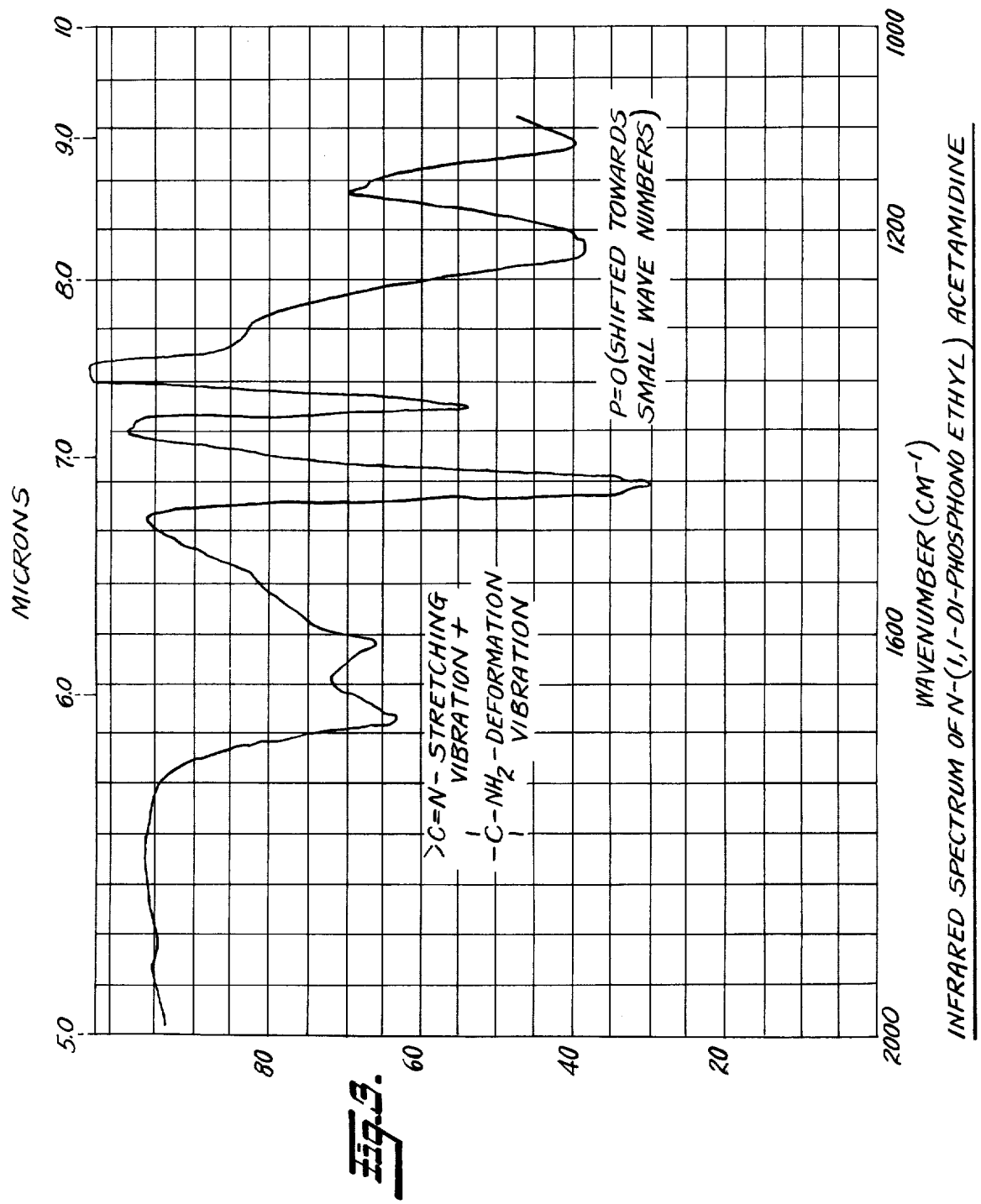

N-(1,1-DI-PHOSPHONO ETHYL) ACETAMIDINE, PROCESS OF MAKING IT, AND METHOD OF USING IT FOR PREVENTING SCALE FORMATION

BACKGROUND OF THE INVENTION

1. Field Of The Invention

The present invention relates to novel phosphonic acid compounds and more particularly to N-(1,1-di-phosphono ethyl) acetamidine, its manufacture, and its use for preventing scale and deposit formation in aqueous systems.

2. Description Of The Prior Art

During the last years phosphonic acid compounds have achieved increased importance because they are not only excellent complexing agents but they prevent scale and deposit formation in aqueous systems even when added thereto in substoichiometric amounts.

An important class of such phosphonic acids are the alkane diphosphonic acids of which the most effective representative is 1-amino ethane-1,1-diphosphonic acid. This compound is produced by reacting acetonitrile with phosphorus tribromide or phosphorus trichloride or, respectively, by reacting acetamide with phosphorus trichloride or a mixture of phosphorus trichloride and phosphorous acid followed by hydrolysis of the intermediate product.

1-Amino-ethane-1,1-diphosphonic acids which are substituted at the amino group have also been produced. In such compounds one or two hydrogen atoms of the amino group are replaced by alkyl, aralkyl, phenyl, or cycloaliphatic residues. Such compounds are, for instance, N-methyl or N,N-dimethyl amino ethane-1,1-di-phosphonic acids. The preparation of such compounds which are substituted in the amino group, however, requires relatively expensive starting materials and the procedure is rather complicated, thus representing a considerable disadvantage.

SUMMARY OF THE INVENTION

It is one object of the present invention to provide a novel and highly advantageous phosphonic acid compound, namely N-(1,1-di-phosphono ethyl) acetamidine which may also be designated as N-acetamidino ethane-1,1-diphosphonic acid, said acid having a high seeding or complexing activity in substoichiometric amounts.

Another object of the present invention is to provide a simple and effective process of producing said N-(1,1-di-phosphono ethyl) acetamidine from non-expensive and readily available starting materials.

A further object of the present invention is to provide a highly effective scale and deposit formation preventing composition consisting of or, respectively, containing said N-(1,1-di-phosphono ethyl) acetamidine.

Still another object of the present invention is to provide a simple and effective method of preventing scale and deposit formation in aqueous systems by the addition of said N-(1,1-di-phosphono ethyl) acetamidine even in substoichiometric amounts.

Other objects of the present invention and the advantageous features thereof will become apparent as the description procedes.

In accordance with the present invention the novel N-(1,1-di-phosphono ethyl) acetamidine of the following formula

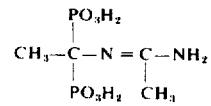

is obtained by reacting urea or, respectively, acetyl urea with phosphorous acid and acetylchloride. It could not be expected and is quite surprising that said reaction would yield the novel acetamidine compound when taking into consideration the heretofore known methods of producing amidines as they are described, for instance, in Houben-Weyl "Methoden der organischen Chemie" Volume 11/2 (1958), page 38 et seq. The reaction proceeds according to the following equation:

$$NH_2-C-NH_2 + 2 CH_3COCl + 2 H_3PO_3 \longrightarrow$$
$$\phantom{NH_2-C-N}|$$
$$\phantom{NH_2-C-NH}O$$

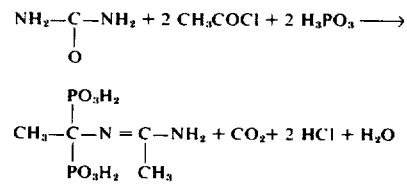

Preferably the acid is produced by mixing one mole of urea or acetylurea with two moles of phosphorous acid and heating the mixture in a water bath to 100°C. whereby a melt is obtained. Two to four moles of acetylchloride are added drop by drop thereto within 1 hour while stirring and heating the reaction mixture under reflux. After the acetylchloride has been added, stirring and heating of the reaction mixture in a water bath at about 100°C. is continued under reflux until all of the acetylchloride has reacted and there is no reflux of acetylchloride. Usually one to two hours are required for the reaction. Thereafter, the mixture is heated to 130°-150°C. (temperature measured within the reaction mixture) for about 3 to 5 hours. Thereby, volatile by-products are distilled off. After cooling, the sirup solidifies and can readily be pulverized.

In place of phosphorous acid, there can also be used phosphorus trichloride and an amount of water sufficient to form phosphorous acid. If the reaction is carried out in this manner, it is advantageous first to add phosphorus trichloride drop by drop to the calculated amount of water and then add acetylchloride thereto while cooling because otherwise too vigorous a reaction will take place. Finally the urea or, respectively, acetylurea is added. When proceeding in this manner, it is of importance that no excess water is present in the reaction mixture.

It is also possible to react urea or acetylurea with the reaction mixture of glacial acetic acid and phosphorus trichloride in the proportion 3:1. Thereby, phosphorous acid and acetylchloride are formed which then react with the urea or acetylurea. When proceeding as described above according to the present invention, no undesired by-products such as decomposition products of trivalent phosphorus which usually are produced in reactions of this type, are found. Therefore, expensive and complicated working up of the reaction solution is avoided.

Addition of even substoichiometric amounts (seeding amounts) of the resulting phosphonic acid according to the present invention prevents deposition of scale forming deposits in aqueous systems. In addition thereto the new phosphonic acid possesses excellent complexing properties with respect to bivalent and polyvalent metal ions, such as calcium, magnesium, iron, chromium, manganese, and other metal ions. The acid can be incorporated into solid or liquid compositions which are added to the aqueous media. The new phosphonic acid according to the present invention is also compatible with conventional detergents as well as washing and cleaning agents and thus can be added to such detergent and cleaning compositions. Of special advantage has proved its use, for instance, in automatically operating bottle cleansing machines or for cleaning tanks and containers.

BRIEF DESCRIPTION OF THE DRAWINGS

The attached drawings serve to characterize the novel N-(1,1-di-phosphono ethyl) acetamidine of the present invention. In said drawings FIG. 2 illustrates its H-nuclear magnetic resonance spectrum (H-NMR spectrum), and FIG. 3 illustrates its infrared spectrum.

DESCRIPTION OF THE PREFERRED EMBODIMENTS

Figure 1:
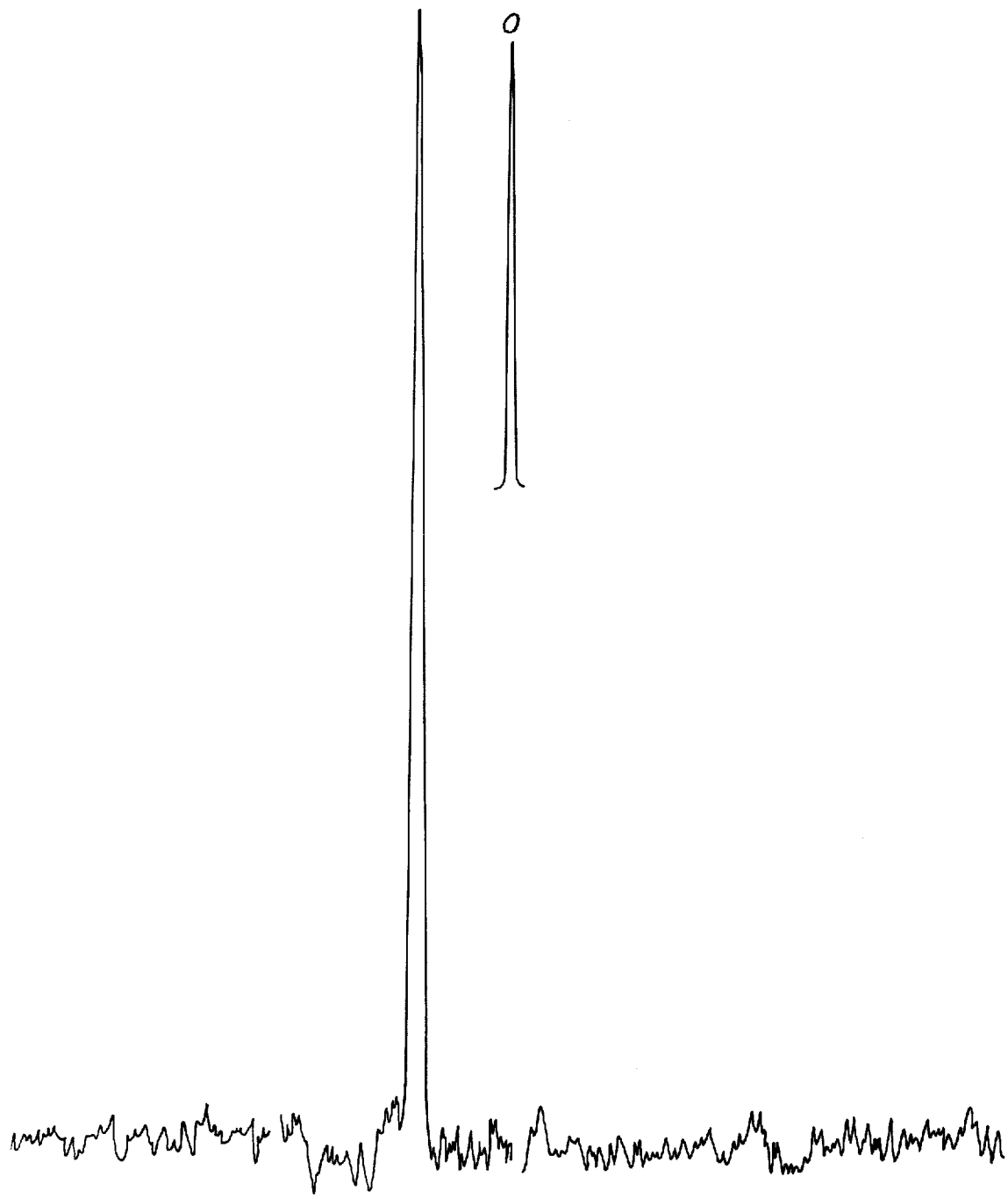
FIG. 1 illustrates its P-nuclear magnetic resonance spectrum (P-NMR-spectrum)

The following examples serve to illustrate the process of producing the new N-(1,1-di-phosphono ethyl) acetamidine according to the present invention without, however, being limited thereto.

EXAMPLE 1

102 g. (1 mole) of acetylurea and 164 g. (2 moles) of phosphorous acid are mixed with each other and are heated in a water bath to 100°C. Thereby a melt is formed into which 196.25 g. (2.5 moles) of acetylchloride are added drop by drop within 1 hour while stirring. Stirring of the resulting melt in the boiling water bath under reflux is continued for 1 more hour until all of the acetylchloride has reacted and reflux has ceased. The reaction mixture is then heated in an oil bath to 130°C. and is kept at said temperature for 3 more hours. The volatile reaction products are distilled off during said period of time. A clear, almost colorless sirup is obtained. It solidifies on cooling and can readily be pulverized. Yield: 308 g.

The cooled product can be used directly in its solid form or after it has been dissolved in water or in an alkali metal hydroxide or carbonate solution. It possesses an excellent seeding activity.

For analyzing the acid, a sample of the reaction product is recrystallized from water. Thereby the phosphonic acid with one mole of crystal water is obtained.

Melting point: 252°–254°C.

Analysis: $C_4H_{14}O_7N_2P_2$; molecular weight: 264;
Calculated: 10.6%, N; 23.43%, P.
Found: 10.4% N; 10.6%, N; 24.0%, P; 24.1%, P.

On drying the product at 150°C. for 2 hours it loses 6.8% (calculated for one mole of water: 6.82%).

Melting point: 252°–254°C.

Analysis: $C_4H_{12}O_6N_2P_2$; molecular weight: 246;
Found: 19.3%, C; 3.9%, H; 40.0%, O; 11.2%, N; 25.6%, P. Calculated: 19.5%, c; 4.87%, H; 39.0%, O; 11.4%, N; 25.2%, P.

The phosphorus-nuclear magnetic resonance spectrum (P-NMR spectrum) shows that the compound contains only one type of phosphorus. See FIG. 1 attached hereto.

Furthermore it follows from its Hydrogen-nuclear magnetic resonance spectrum (H-NMR spectrum) that two phosphonic acid groups of the same kind are present in the molecule which are coupling with the protons of a methylene or methyl group. In addition thereto the molecule contains a further methyl group (or similar protons) which, however, do not couple. See FIG. 2 attached hereto.

The position of the double bound was determined by the infrared spectrum. See FIG. 3 attached hereto.

These spectra prove the claimed structure of the new phosphonic acid.

EXAMPLE 2

60.06 g. (1 mole) of urea and 164 g. (2 moles) of phosphorous acid are heated in the boiling water bath while stirring. 264.8 g. (3.5 moles) of acetylchloride are added drop by drop to the resulting mixture within about one hour. Stirring is continued for 1 more hour. During this time reflux of the acetylchloride ceases slowly and the temperature within the reaction mixture increases from 60° to 90°C. The resulting water-clear sirup is then heated to 130°C. and stirring is continued at said temperature for 2 to 3 more hours. Thereby the volatile by-products distill off. On cooling, the sirup solidifies and is pulverized. The phosphonic acid can be used in its solid form as well as in the form of a 20% solution.

EXAMPLE 3

274.6 g. (2 moles) of phosphorus trichloride are slowly added to 108 g. (6 moles) of water while cooling and stirring. Thereafter, 314.0 g. (4 moles) of acetylchloride and, finally 60.06 g. (1 mole) of urea are added thereto. The mixture is heated to boiling in a water bath whereby vigorous refluxing starts. Stirring of the reaction mixture in the boiling water bath is continued for 1 more hour. Thereby a crystalline slurry is obtained which is heated in an oil bath at 130°C. for 3 more hours. After cooling and pulverizing the residue, 300 g. of the phosphonic acid are obtained.

EXAMPLE 4

274.6 g. (2 moles) of phosphorus trichloride are added drop by drop to a mixture of 120.12 g. (2 moles) of urea and 360.3 g. (6 moles) of glacial acetic acid while cooling with water and stirring. The reaction mixture is then heated to boiling and stirring is continued at said temperature for 1½ hours. Thereafter, vigorous initial refluxing ceases completely. A thick while crystalline slurry is obtained which is subsequently heated in an oil bath to a temperature of 130°–140°C. (measured within the reaction mixture) for about 2 hours. After cooling and pulverizing the residue, about 390g. of the crude phosphonic acid are obtained.

EXAMPLE 5

A mixture of 274.6 g. (2 moles) of phosphorus trichloride and 100 ml. (1.05 moles) of acetic acid anhydride is added drop by drop to a mixture of 80 g. (1.33 moles) of urea and 360.3 g. (6 moles) of glacial acetic acid while cooling and stirring. Stirring of the mixture is continued while heating it in a boiling water bath for 3 hours and subsequently in an oil bath at a temperature of 130°C. for 2 hours. The content of the reaction vessel is dissolved in water while still hot. 1,200 g. of a clear, dark-brown solution which contains 50% of the phosphonic acid according to the present invention are obtained. The solution can directly be used without isolating the phosphonic acid.

The following examples illustrate improved cleaning and rinsing fluids containing the N-(1,1-di-phosphono ethyl) acetamidine of the present invention without, however, being limited thereto.

EXAMPLE 6

Composition

Sodium metasilicate 35%;
N-(1,1-di-phosphono ethyl) acetamidine 3%;
sodium carbonate 20%;
sodium hydroxide 17%;
wetting agent 5%;
sodium sulfate 10%;
trisodium orthophosphate 10%.

1% aqueous solutions of said composition are used as cleaning fluid for cleaning milk cans.

EXAMPLE 7

Composition

A 67% aqueous gluconic acid solution 40%;
the N-(1,1-di-phosphono ethyl) acetamidine solution in water obtained according to Example 5 60%

0.2% of said mixture are added to a 1% sodium hydroxide solution. The resulting cleaning solution has proved to be highly effective in cleaning and rinsing glass bottles.

It is, of course, understood that any other type of aqueous cleaning and rinsing fluids than those given in Examples 6 and 7 can be used and that the effective scale and deposit formation preventing composition according to the present invention can be replaced by any other cleaning and rinsing composition and fluid containing the N-(1,1-di-phosphono ethyl) acetamidine according to the present invention.

The attached Table illustrates the results achieved by testing the scale and deposit formation suppressing or preventing effect of the N-(1,1-di-phosphono ethyl) acetamidine according to the present invention in comparison with the known amino ethane 1,1-di-phosphonic acid. This Table shows the threshold values of both compounds at room temperature. The threshold values were determined by adding to and dissolving in one liter of water of about 15° German hardness placed in a glass beaker a predetermined amount, in mg., of the compound to be tested. 12 g. of sodium hydroxide were added thereto. The beaker was covered with a watch glass and was allowed to stand at room temperature. It was then observed and noted after how many days a glass rod placed into the beaker and/or the walls of the beaker showed formation and deposition of crystals thereon.

O in the following table indicates that no crystals, i.e. incrustations are deposited on the glass rod and/or the wall of the beaker.

| No. | Compound | Amount mg. | 1 | 2 | 3 | 4 | 5 | 6 | 7 | 8 | 9 | 10 | 11 | 12 |
|---|---|---|---|---|---|---|---|---|---|---|---|---|---|---|
| 1 | N-(1,1-di-phosphono ethyl)acetamidine | 3.0 | 0 | 0 | 0 | 0 | 0 | 0 | | | | | | |
| | | 5.0 | 0 | 0 | 0 | 0 | 0 | 0 | 0 | 0 | 0 | | | |
| 2 | Amino ethane-1,1-di-phosphonic acid | 3.0 | 0 | 0 | | | | | | | | | | |
| | | 5.0 | 0 | 0 | 0 | 0 | 0 | 0 | | | | | | |

In place of phosphorus trichloride as used in the reaction according to the present invention and the preceding examples 1 to 5, there can be employed equivalent amounts of other phosphorus trihalogenides, such as phosphorus tribromide and phosphorus triiodide. These phosphorus trihalogenides yield also phosphorous acid when mixed with the required amount of water.

The amounts of N-(1,1-diphosphono ethyl) acetamidine to be added to the cleaning and rinsing fluids may vary depending upon their use. Usually amounts between about 3 mg./l. and about 1000 mg./l. and preferably amounts between about 5 mg./l. and about 500 mg./l. have proved to yield satisfactory results although the cleaning and rinsing fluids are not limited to such amounts or the amounts given hereinabove in Examples 6 and 7 and the Table.

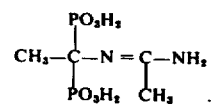

We claim:

1. N-(1,1-Di-phosphono ethyl) acetamidine of the formula